US008201552B2

(12) United States Patent
Ploof et al.

(10) Patent No.: US 8,201,552 B2
(45) Date of Patent: Jun. 19, 2012

(54) OVEN WITH FOOD PRODUCT RACK

(75) Inventors: Michael J. Ploof, Puyallup, WA (US); Joseph V. Nelson, Orting, WA (US)

(73) Assignee: Premark FEG L.L.C., Wilmington, DE (US)

( * ) Notice: Subject to any disclaimer, the term of this patent is extended or adjusted under 35 U.S.C. 154(b) by 950 days.

(21) Appl. No.: 12/209,521

(22) Filed: Sep. 12, 2008

(65) Prior Publication Data

US 2010/0064904 A1    Mar. 18, 2010

(51) Int. Cl.
*F24C 15/16*    (2006.01)

(52) U.S. Cl. .............................. 126/338; 99/448; 99/449

(58) Field of Classification Search ............. 99/334, 99/443 R, 448, 479; 211/126.16, 132.1, 211/133.1; 126/337 R, 338, 332, 229; 432/137, 432/138
See application file for complete search history.

(56) References Cited

U.S. PATENT DOCUMENTS

| | | | | |
|---|---|---|---|---|
| 1,950,292 A | * | 3/1934 | Brand | 99/479 |
| 2,440,513 A | * | 4/1948 | Garey et al. | 211/201 |
| 3,595,178 A | * | 7/1971 | Dahlen | 432/241 |
| 3,618,511 A | | 11/1971 | Matthews | |
| 3,655,063 A | * | 4/1972 | Landry | 211/41.2 |
| 3,698,782 A | * | 10/1972 | Onori | 312/350 |
| 3,954,053 A | | 5/1976 | Johnsson et al. | |
| 4,202,259 A | | 5/1980 | Johnsson | |
| 4,375,354 A | * | 3/1983 | Henriksson | 432/239 |
| 4,527,707 A | | 7/1985 | Heymann et al. | |
| 5,269,112 A | * | 12/1993 | Weinrub et al. | 52/646 |
| 5,394,791 A | | 3/1995 | Vallee | |
| 5,615,603 A | * | 4/1997 | Polin | 99/331 |
| 5,617,839 A | | 4/1997 | Jennings et al. | |
| 5,957,309 A | * | 9/1999 | Hall | 211/126.2 |
| 6,131,507 A | * | 10/2000 | Westbergh | 99/427 |
| 6,883,513 B2 | | 4/2005 | Bock | |
| 6,974,042 B2 | * | 12/2005 | Hall | 211/133.1 |
| 7,604,002 B2 | * | 10/2009 | Rabas et al. | 126/337 R |

\* cited by examiner

*Primary Examiner* — Mark Graham

(74) *Attorney, Agent, or Firm* — Thompson Hine LLP

(57) ABSTRACT

An oven includes a chamber for receiving a food product rack. A heating system provides heat to the chamber for a cooking operation. A rotatable output member extends downward from a top portion of the chamber. A pivot support extends upward from a bottom portion of the chamber. A food product rack is removably located in the chamber and is releasably connected to the rotatable output member for rotation therewith. The food product rack includes a frame assembly including multiple sides. Multiple tray supports are located along the height of the frame assembly. A bottom support extends laterally between opposite sides of the frame assembly and passes through a vertical rotation axis of the frame assembly. The bottom support is connected at one end to a bottom portion of one side of the frame assembly and is connected at an opposite end to the bottom portion of an opposite side of the frame assembly. The bottom support releasably engages with the frame assembly and is configured to be disconnected from the frame assembly without use of tools by manually reorienting the bottom support from a locked orientation to a release orientation. The bottom support includes an underside that is engaged with the pivot support.

16 Claims, 10 Drawing Sheets

OVEN WITH FOOD PRODUCT RACK

TECHNICAL FIELD

This application relates generally to commercial ovens and, more particularly, to an oven with a food product rack.

BACKGROUND

Rack ovens are generally equipped with a fuel-fed heating element and a fan for moving heated air throughout a baking chamber to provide a rapid distribution of hot air over the food product. Commercial ovens of this type include a baking chamber, which is sized to receive a rack having multiple shelves containing products to be baked; a power driven, rotating rack carrier to rotate the product as it is being cooked or baked; a heat exchanger such as one or more gas burners and an exhaust system to eliminate combustion gases or an electrical heating element; and a circulating system for directing hot air along a heated air flow path that passes through the baking chamber. Conventional rack ovens of the type for baking bread also may include a steam generator for the introduction of steam into the oven for brief periods of time, usually at the beginning of the baking process, to impart a desired appearance to the baked food product.

Various types of food product racks exist in the industry. Improvements are regularly sought for a variety of reasons, including cost, ease of manufacture and reliability.

SUMMARY

In an aspect, an oven includes a chamber for receiving a food product rack. A heating system provides heat to the chamber for a cooking operation. A rotatable output member extends downward from a top portion of the chamber. A pivot support extends upward from a bottom portion of the chamber. A food product rack is removably located in the chamber and is releasably connected to the rotatable output member for rotation therewith. The food product rack includes a frame assembly including multiple sides. Multiple tray supports are located along the height of the frame assembly. A bottom support extends laterally between opposite sides of the frame assembly and passes through a vertical rotation axis of the frame assembly. The bottom support is connected at one end to a bottom portion of one side of the frame assembly and is connected at an opposite end to the bottom portion of an opposite side of the frame assembly. The bottom support releasably engages with the frame assembly and is configured to be disconnected from the frame assembly without use of tools by manually reorienting the bottom support from a locked orientation to a release orientation. The bottom support includes an underside that is engaged with the pivot support.

In another aspect, a method of cleaning a rack oven includes a heating system that provides heat to a chamber for a cooking operation. The method includes performing a cooking operation using a food product rack including a frame assembly removably located within the chamber of the rack oven. The food product rack is releasably connected to a rotatable output member in the chamber for rotating the food product rack about a vertical rotation axis during the cooking operation. A bottom support is removed from the food product rack overlying a floor of the heating chamber. The bottom support is releasably connected at one end to a bottom portion of one side of the frame assembly and is connected at an opposite end to the bottom portion of an opposite side of the frame assembly. The bottom support is releasably engaged with the frame assembly and the removing step occurs by manually reorienting the bottom support from a locked configuration to a release configuration.

In another aspect, a food product rack is provided for an oven including a chamber for receiving the food product rack. A heating system provides heat to the chamber for a cooking operation and a rotatable output member extending downward from a top portion of the chamber. The food product rack includes a frame assembly including multiple sides. The frame assembly is connectable to the rotatable output member of the oven for rotation during a cooking operation. Multiple tray supports are located along the height of the frame assembly. A bottom support extends laterally between opposite sides of the frame assembly and passes through a vertical rotation axis of the frame assembly. The bottom support is connected at one end to a bottom portion of one side of the frame assembly and is connected at an opposite end to the bottom portion of an opposite side of the frame assembly. The bottom support is releasably engaged with the frame assembly and is configured to be disconnected from the frame assembly without use of tools by manually reorienting the bottom support from a locked orientation to a release orientation.

The details of one or more embodiments are set forth in the accompanying drawings and the description below. Other features, objects, and advantages will be apparent from the description and drawings, and from the claims.

DETAILED DESCRIPTION

Figure 1:
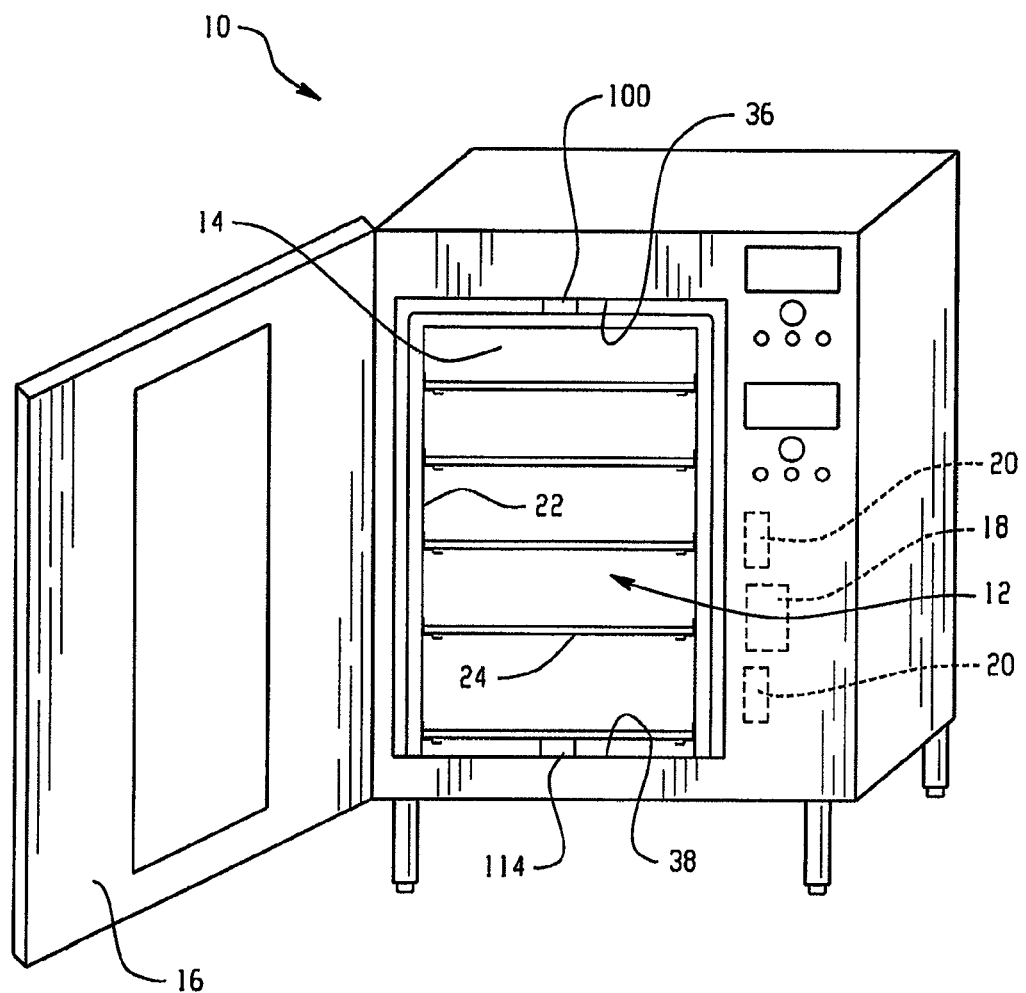
FIG. 1 is a diagrammatic, perspective view of an embodiment of an oven including removable food product rack.

Referring to FIG. 1, an oven 10 includes a cooking chamber 12 formed by a number of chamber walls 14 and a door 16 that has an open configuration for allowing access to the cooking chamber and a closed configuration for preventing access to the cooking chamber. A heating system 20 (e.g., including resistive heating elements) is provided for heating the food product in the cooking chamber 12 during a cooking operation. In some embodiments, a fan or blower 18 is operated to cause heated air to circulate in the cooking chamber. The heating system 20 could also be formed by a gas fuel system including gas burners, heat exchange tubes and a blower, which may be located behind a side wall of the cooking chamber 12.

A food product rack 22 is located in the cooking chamber 12. The food product rack 22 includes a number of trays 24 that hold food product thereon.

Figure 2:
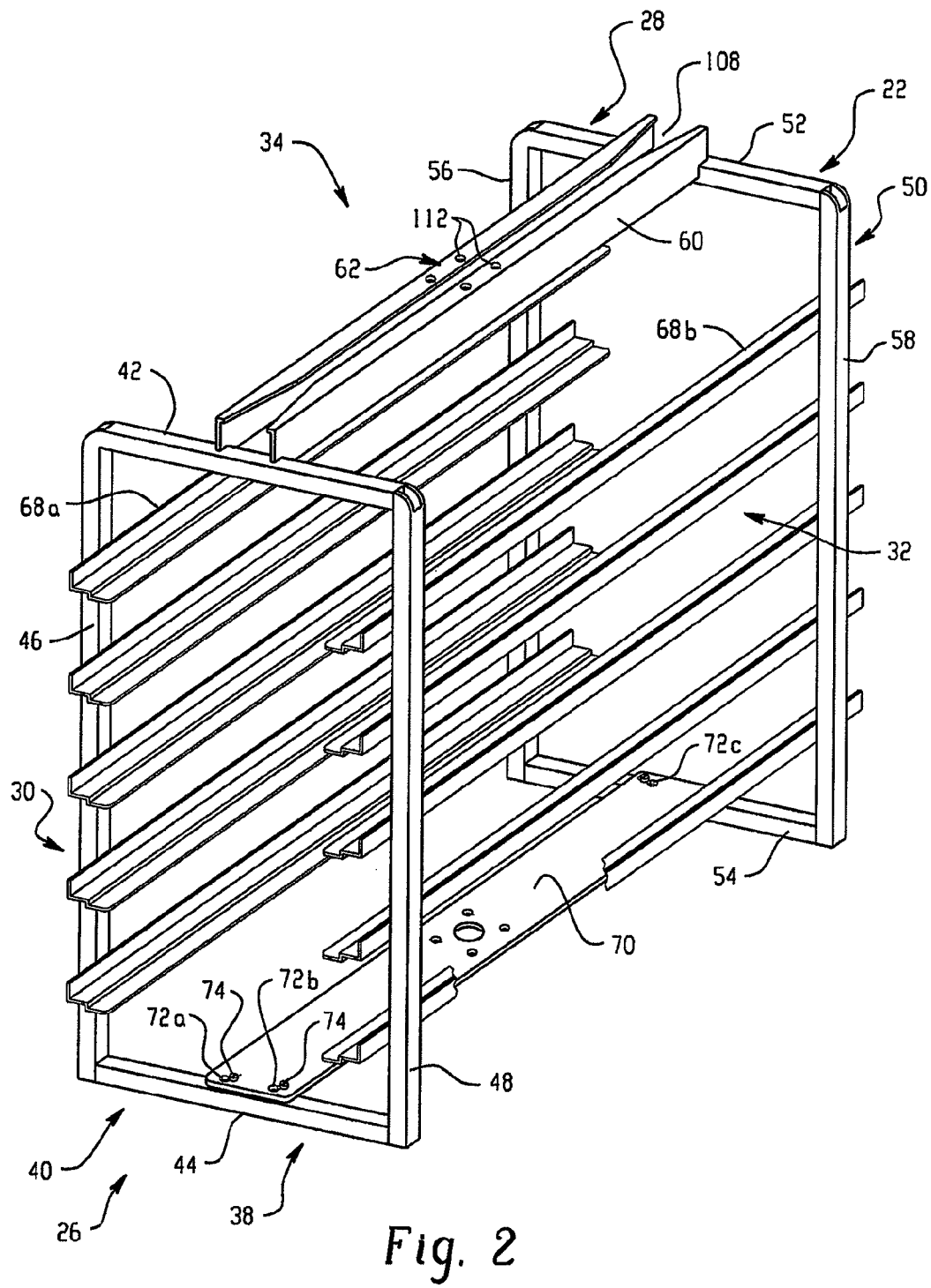
FIG. 2 is a perspective view of an embodiment of a food product rack for use in the oven of FIG. 1.

Referring to FIG. 2, the food product rack 22 is shown removed from the cooking chamber 12. The food product rack 22 includes a front side 26, a rear side 28 and opposite sides 30 and 32 extending between the front and rear sides. The food product rack 22 also includes a top portion 34 to be placed near to a ceiling 36 (FIG. 1) of the cooking chamber 12 and a bottom portion to be placed near to a floor 38 (FIG. 1) of the cooking chamber. The front side 26 is formed by a front frame assembly 40 including a horizontal top support beam 42, a horizontal bottom support beam 44 and vertical side support beams 46 and 48 connecting the top and bottom support beams. The rear side 28 is formed by a rear frame assembly 50 including a horizontal top support beam 52, a horizontal bottom support beam 54 and vertical side support beams 56 and 58 connecting the top and bottom support beams 52 and 54. A top support 60 extends laterally between opposite sides 26 and 28 of the food product rack 22 and is connected at one end to the top support beam 42 of the front frame assembly 40 and at an opposite end to the top support beam 52 of the rear frame assembly 50. The top support 60 includes a connecting location 62 for connecting a rotatable output member connecting structure 64 (see FIG. 9) to the top support 60. The connecting location 62 is used to releasably connect the food product rack 22 to a rotatable output member 66 for effecting rotation of the food product rack 22 about a vertical rotation axis.

A number of shelves or tray supports 68 are located along the height of the food product rack 22. The tray supports 68 extend from the front frame assembly 40 to the rear frame assembly 50 and are connected to respective ones of the side support beams 46, 48, 56 and 58. A tray support (e.g., tray support 68a) is aligned with a corresponding tray support (e.g., tray support 68b) of the opposite side so that the tray located thereon is substantially horizontal.

A bottom support 70 extends laterally between opposite sides 26 and 28 of the food product rack 22 and passes through the vertical rotation axis of the food product rack. The bottom support 70 is connected at one end to the bottom support beam 44 of the front frame assembly 40 and at an opposite end to the bottom support beam 54 of the rear frame assembly 50.

Figure 3:
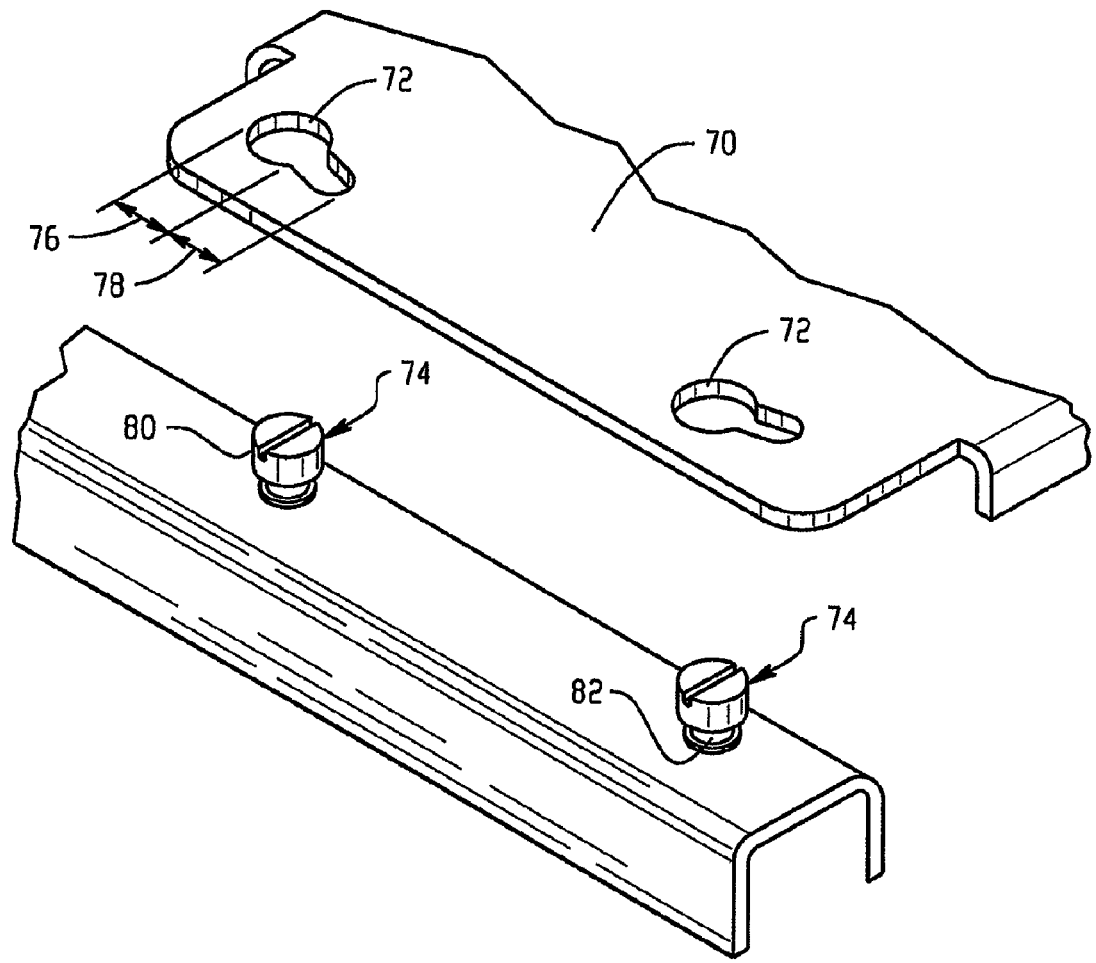
FIG. 3 is a detail view of the food product rack of FIG. 2.
Figure 4A:
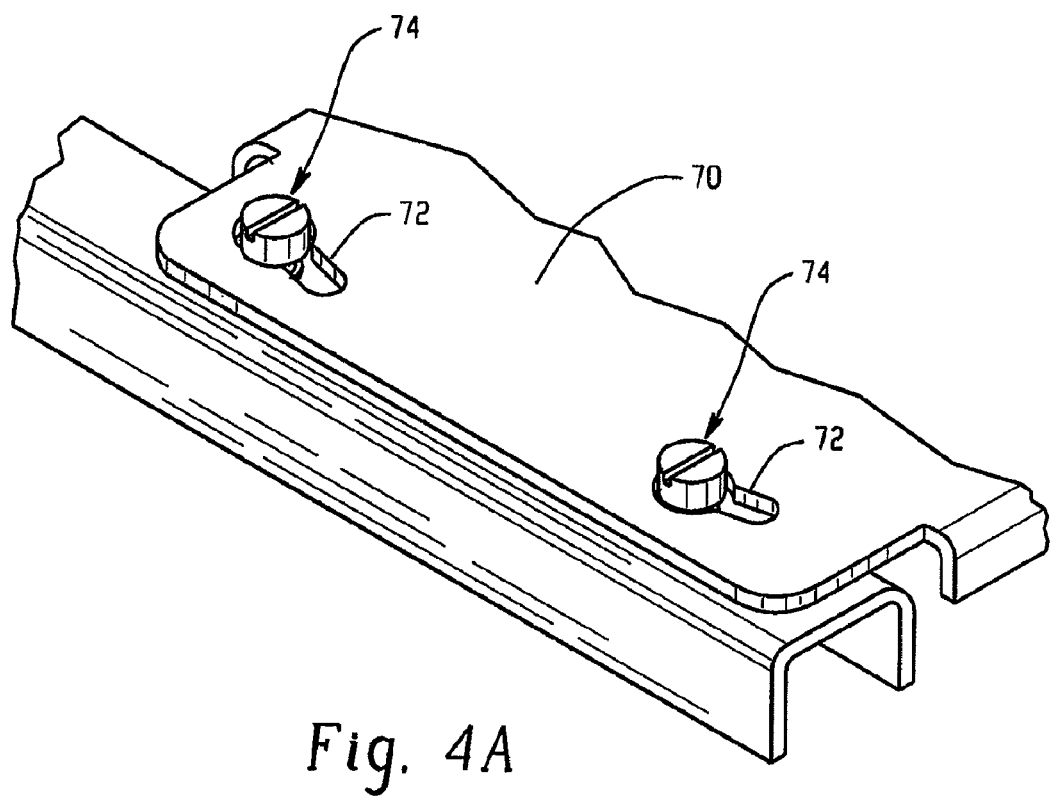
FIG. 4A is a detail view of the food product rack of FIG. 2 illustrating an embodiment of a bottom support in a release configuration.
Figure 4B:
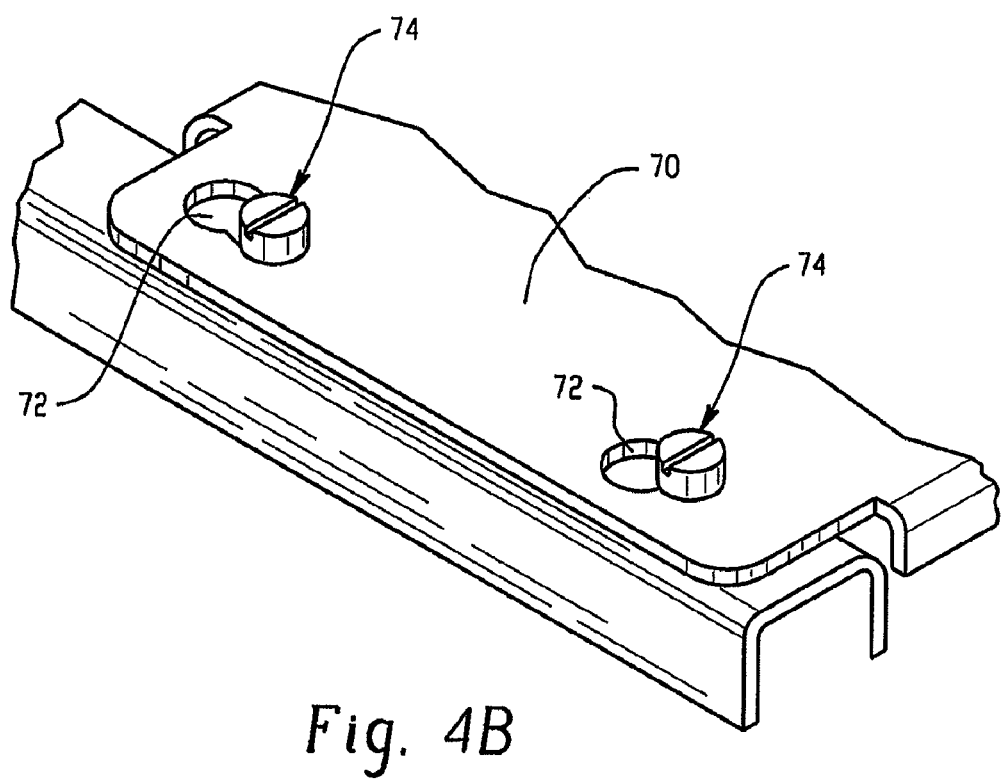
FIG. 4B is a detail view of the food product rack of FIG. 2 showing the bottom support of FIG. 4A in a locked configuration.

The bottom support 70 is releasably connected to the bottom support beams 44 and 54 using keyway slots 72a-72d (only keyslots 72a-72c can be seen in FIG. 2) and locking projections 74. Referring to FIG. 3, each keyway slot 72 includes an enlarged slot portion 76 and a narrow slot portion 78. The enlarged slot portions 76 are sized to receive enlarged head portions 80 of the locking projections 74, with smaller stem portions 82 below the head portions, such that the enlarged head portions 80 pass through and beyond the enlarged slot portions 76 (FIG. 4A). The narrow slot portions 78 of the keyway slots 72 are sized to receive the stem portions 82 with the enlarged head portions 80 extending over and beyond sides of the narrow slot portions 78 thereby locking the bottom support 70 in place (FIG. 4B).

Figure 5:
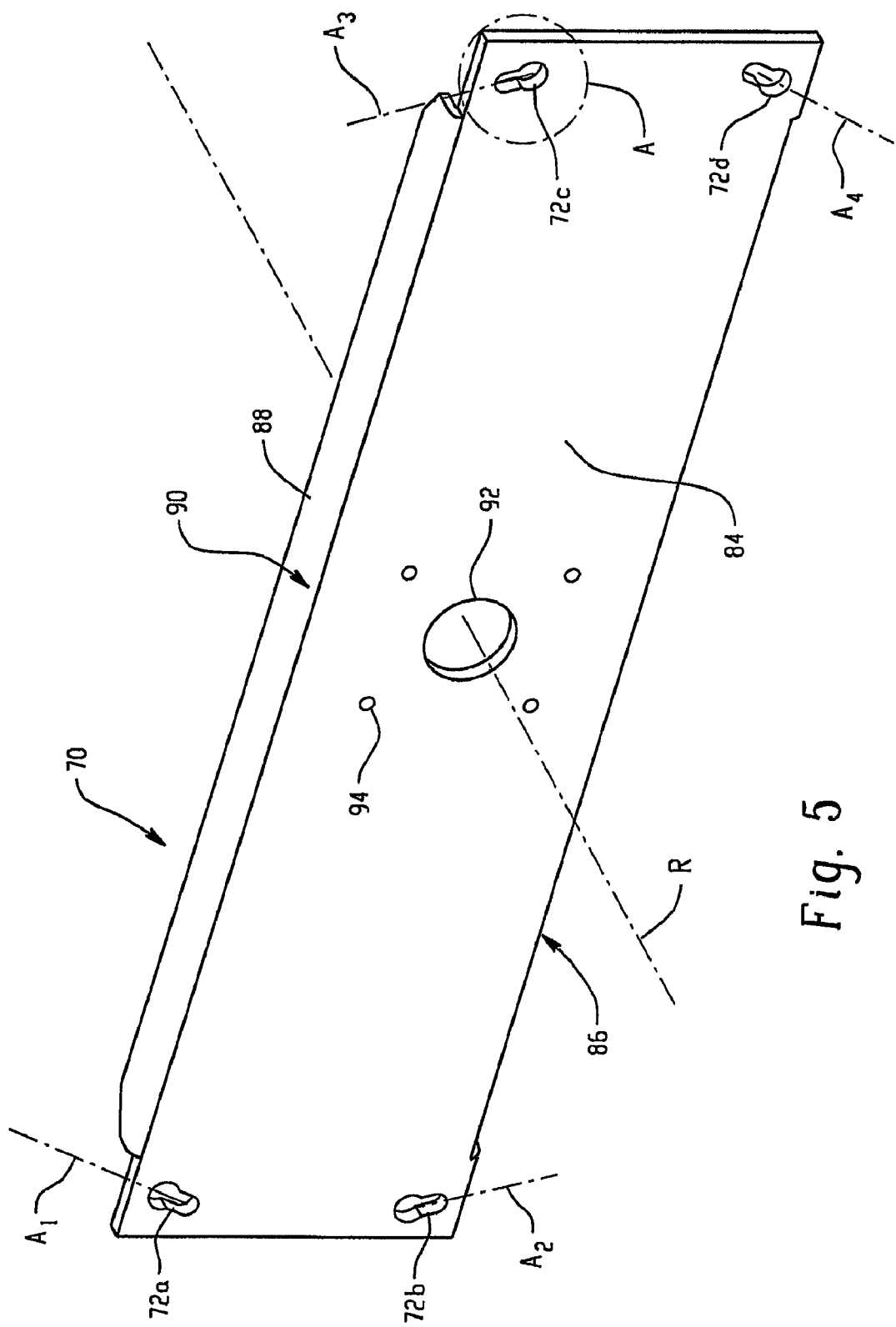
FIG. 5 is a perspective view of the bottom support of FIGS. 4A and 4B.
Figure 5A:
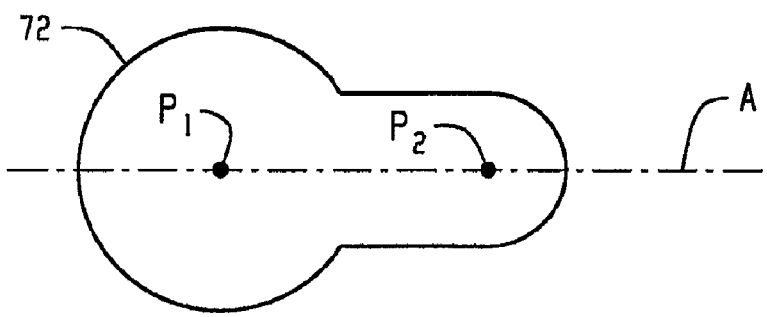
FIG. 5A is a detail view along detail A of FIG. 5.

FIG. 5 shows the bottom support 70 in isolation (i.e., removed from the food product rack 22). The bottom support 70 includes a substantially planar central portion 84 and downwardly turned side portions 86 and 88 that are bent at an angle of about 90 degrees to the central portion, although other configurations are possible. Referring briefly to FIG. 5A, each keyway slot 72 has a long axis A that passes through both a center $P_1$ of the enlarged slot portion 76 and a center $P_2$ of the narrow slot portion 78. As can be seen from FIG. 5, axes $A_1$ and $A_2$ of keyway slots 72a and 72b are at an angle to each other (i.e., they are non-parallel) in the plane formed by the central portion 84 and axes $A_3$ and $A_4$ of keyway slots 72c and 72d are at an angle to each other in the horizontal plane formed by the central portion 84. The angles of the axes $A_1$-$A_4$ are selected to allow the bottom support 70 to be rotated manually about axis R between the release orientation (FIG. 4A) and locked orientation (FIG. 4B) without the use of any tools.

Figure 6:
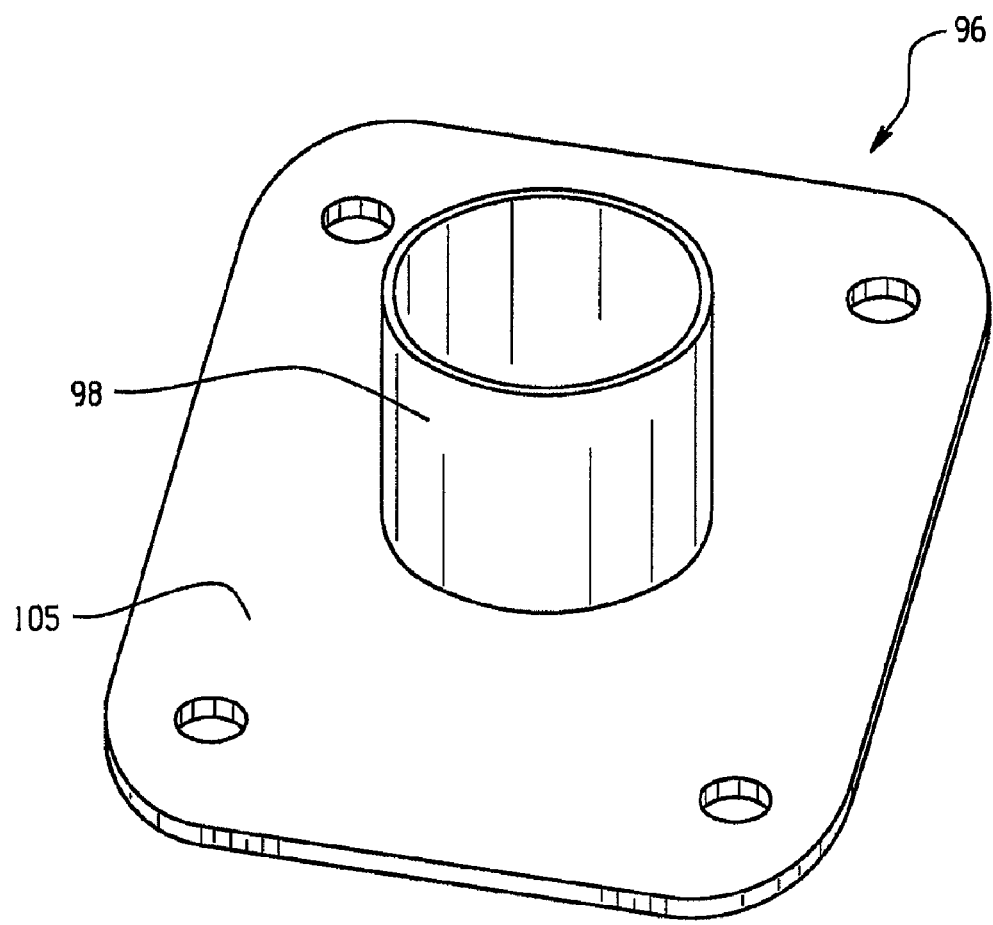
FIG. 6 is a perspective plan view of an embodiment of a pivot support member for use with the bottom support of FIG. 5.
Figure 7:
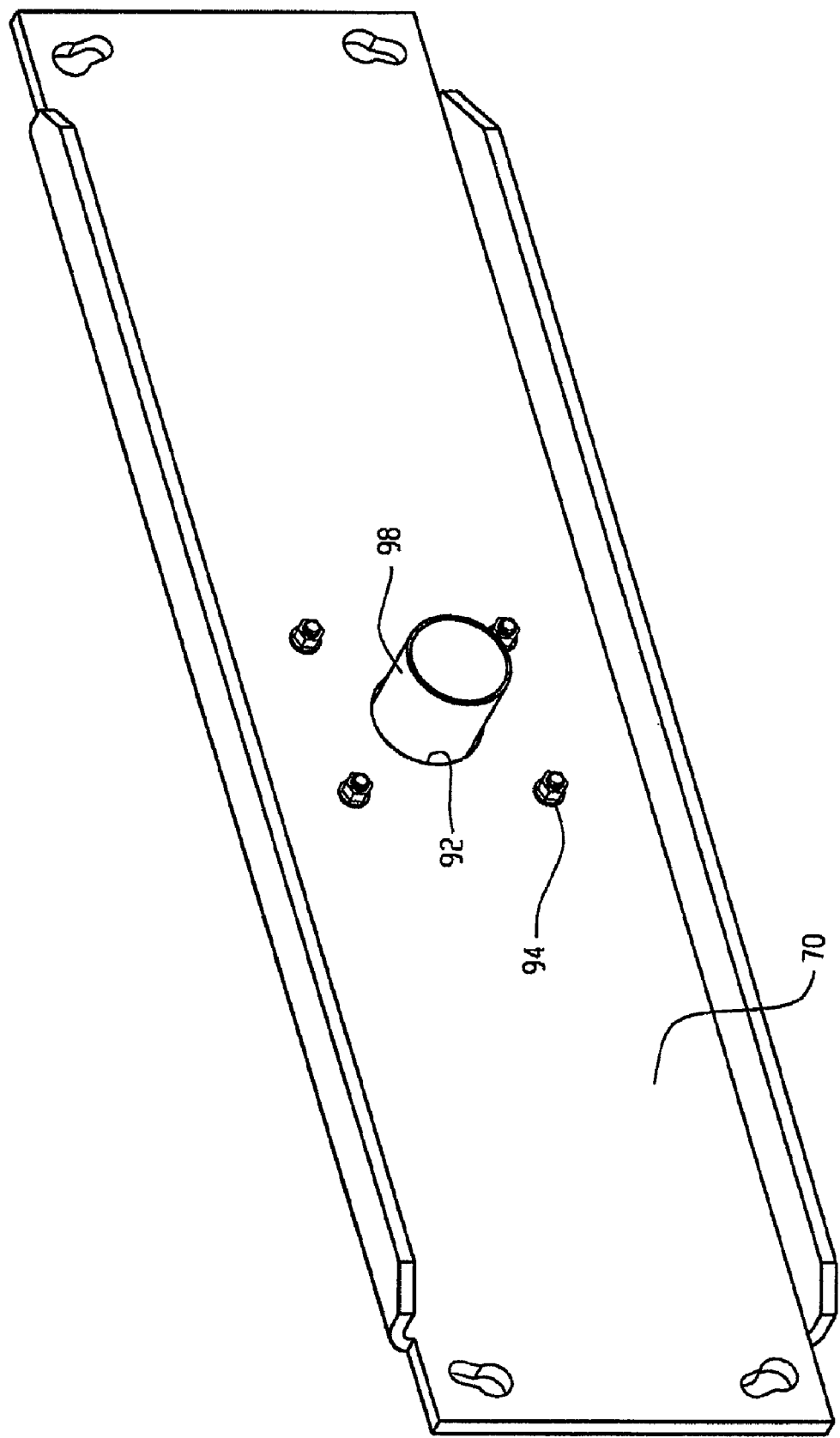
FIG. 7 is a perspective bottom view of the bottom support of FIG. 5 with the pivot support member of FIG. 6 connected thereto.

The bottom support 70 includes a connecting location 90 including an opening 92 and fastener openings 94. Referring to FIGS. 6 and 7, a pivot support member 96 includes a shaft 98 that is sized to be positioned through the opening 92 from the top of the bottom support 70 and fastened to the bottom support using the fastener openings 94 and plate 105 such that the shaft 98 extends downwardly toward the floor 38 when the bottom support is connected to the food product rack 22. The pivot support member 96 rotatably engages a fixed pivot support member 114 (FIG. 8) extending upwardly from the floor 38 of the cooking chamber 12.

Figure 8:
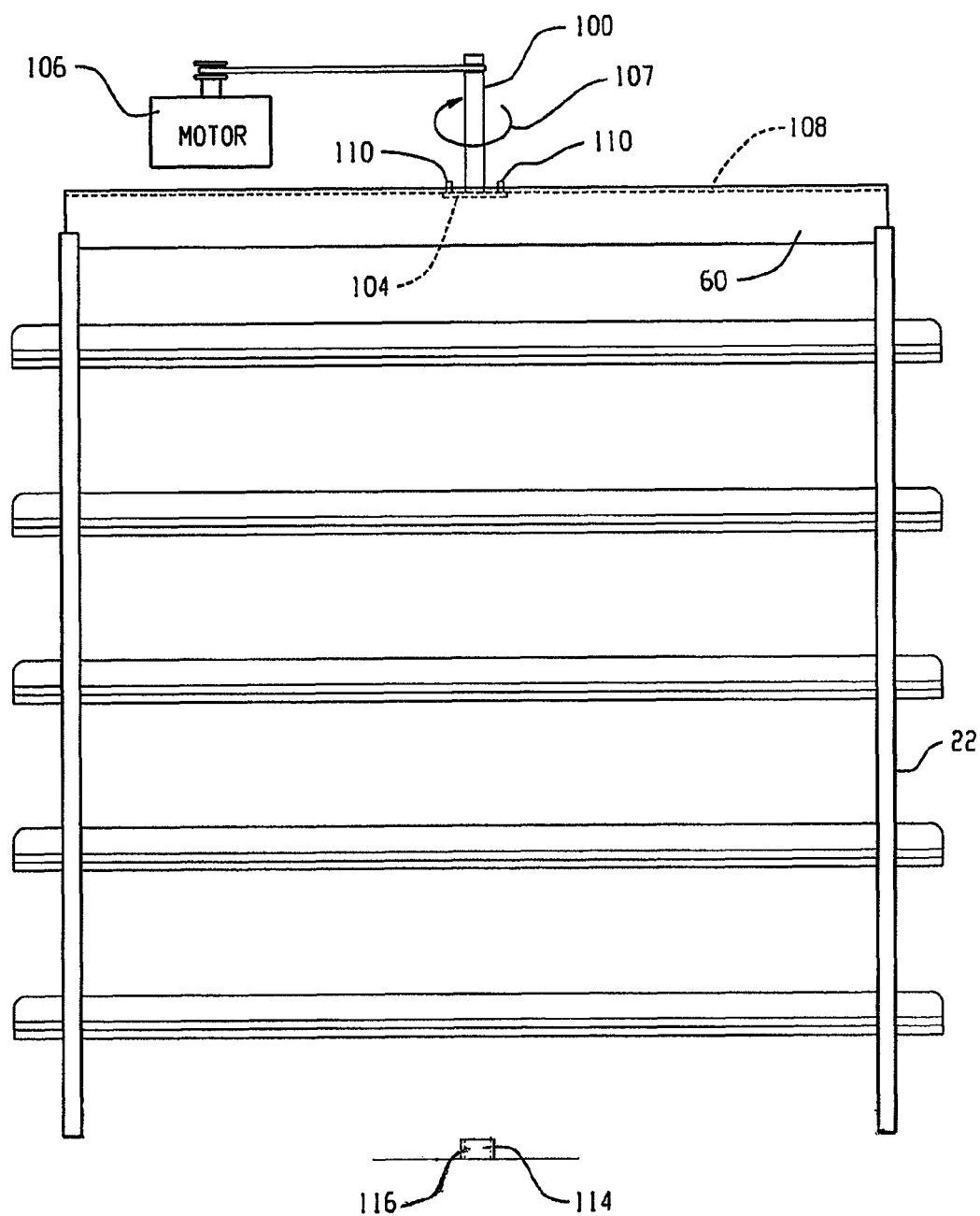
FIG. 8 is a side view of the food product rack of FIG. 2 with bottom support removed being connected to an embodiment of a rotatable output member.

FIG. 8 illustrates the connection of the food product rack 22 within the cooking chamber 12 of the oven 10 (e.g., a typical position after the food product rack being moved into the oven). The food product rack 22 is releasably connected to a rotatable output member 100 (see also FIG. 1). The rotatable output member 102 includes a seating member 104 that extends outwardly from the rotatable output member. The rotatable output member 100 is connected to a motor 106 for effecting rotation of the rotatable output member (see arrow 107) and the food product rack 22 when the food product rack is connected to the rotatable output member.

Figure 9:
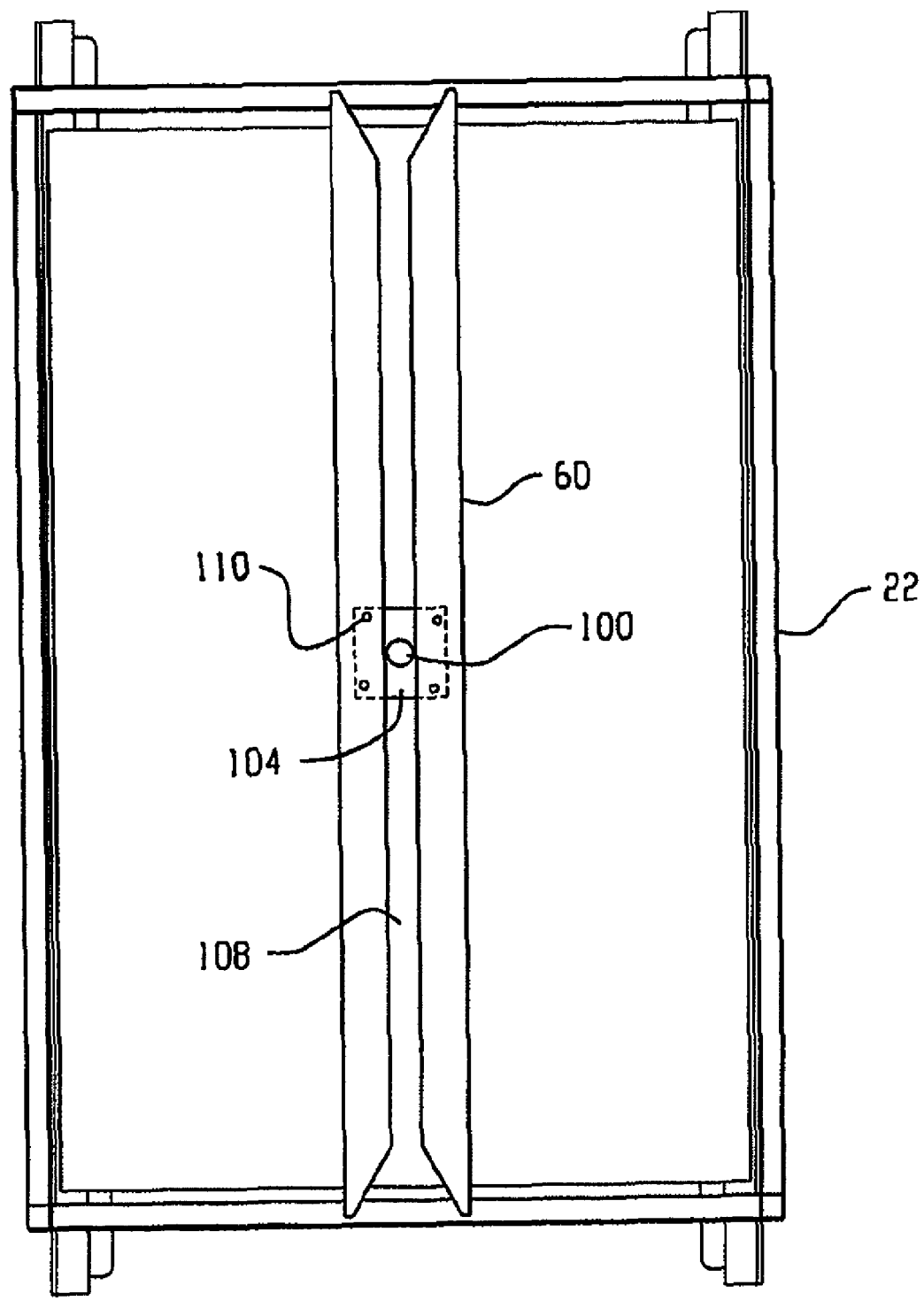
FIG. 9 is a top view of the food product rack connected to the rotatable output member.

The top support 60 includes a slot 108 (FIG. 2) that receives the rotatable output member 100 and the seating member 104. Referring also to FIG. 9, the seating member 104 includes upwardly extending pins 110 that are received within openings 112 formed in the top support 60. Weight of the food product rack 22 maintains the connection between the rotatable output member 100 and the food product rack once the pins 110 are received in the openings 112.

Referring back to FIG. 8, the fixed pivot support member 114 is located at the floor 38 of the cooking chamber 12. The fixed pivot support member 114 may be fastened or otherwise connected to the floor 38 and rotatably engages with the pivot support member 96 connected to the bottom support 70 (FIG. 7) to aid in stabilizing the food product rack 22 as it rotates. In one embodiment, the fixed pivot support member 114 includes an upwardly extending shaft 116 that is received in an opening in the shaft 98 (e.g., shaft 98 may be open-ended). Other configurations are possible. For example, the shaft 116 may be open-ended and receive shaft 98.

Figure 10:
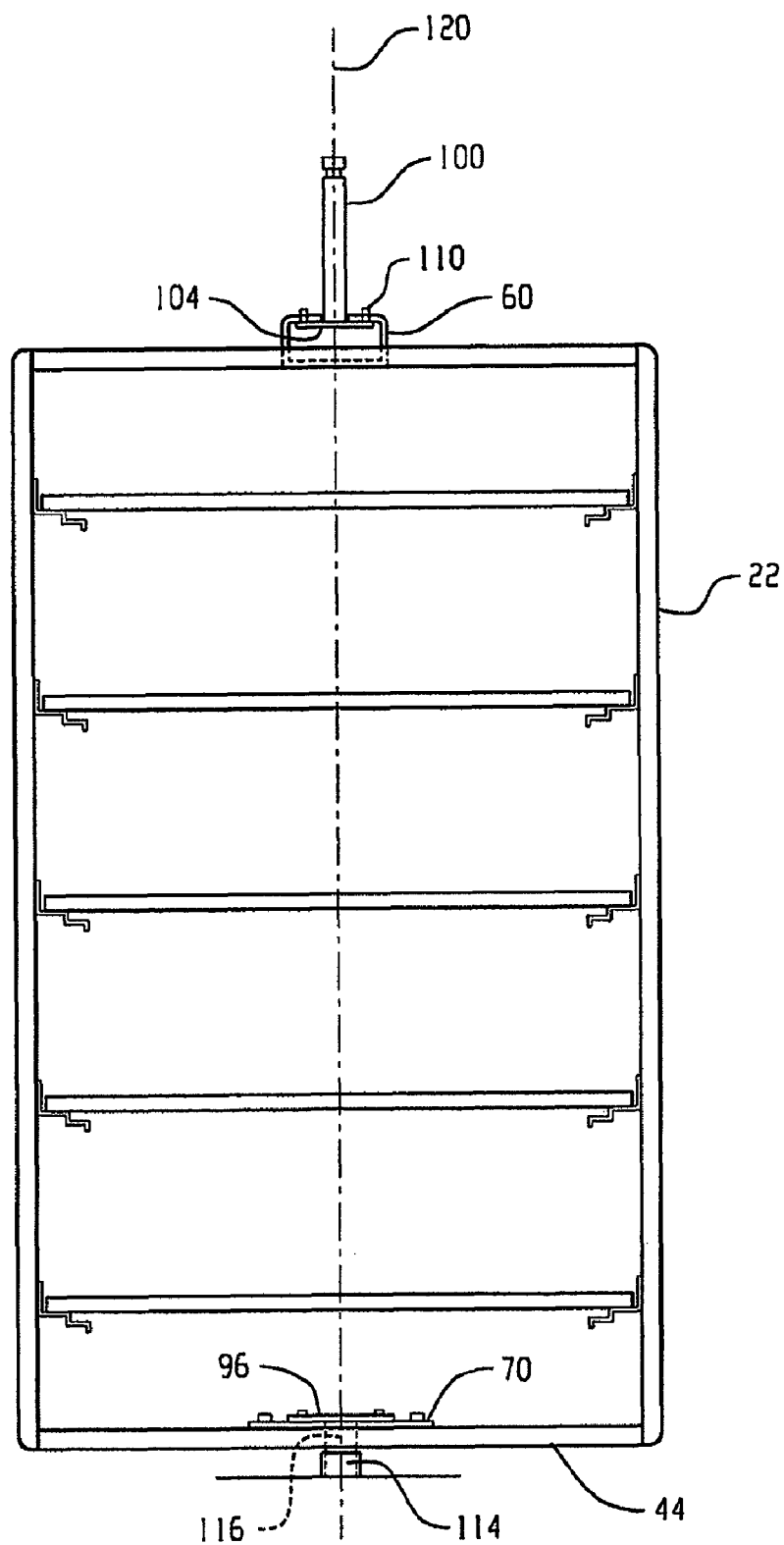
FIG. 10 illustrates the food product rack connected to the rotatable output member and bottom support connected to the food product rack and a fixed pivot support member.

Referring to FIG. 10, once the food product rack 22 is connected to the rotatable output member 100, the bottom support 70 may then be connected to the bottom support beams 44 and 54 by aligning the pivot support member 96 with the fixed pivot support member 114 and the enlarged slot portions 76 of the keyhole slots 72 with the enlarged head portions 80 of the locking projections 74 as described above. The bottom support 70 is then lowered onto the bottom support beams 44 and 54 such that the pivot support member 96 rotatably mates with the fixed pivot support member 114 and the locking projections 74 are received in the enlarged slot portions 76 of the keyhole slots 72.

The operator may then manually rotate the bottom support 70 in a horizontal plane about the vertical rotation axis 120 of the food product rack 22 (e.g., in the clockwise direction) to place the locking projections 74 in the narrow slot portions 78 of the keyhole slots 72, thereby placing the bottom support in its locked orientation. As an alternative, rotation of the food product rack 22 can be used to automatically place the bottom support 70 in its locked orientation once the locking projections 74 are located within the enlarged slot portions 76 of the keyhole slots 72. This automatic placement and/or maintaining of the bottom support 70 in its locked configuration is accomplished due to the direction of rotation of the food product tray about the vertical rotation axis 120 being in the opposite direction of rotation necessary to place the bottom support in its locked orientation. As the food product rack 22 rotates due to its connection to the rotatable output member 100, friction between the pivot support member 96 and the fixed pivot support member 114 allows the food product rack to rotate relative to the bottom support 70 thereby placing the locking projections 74 in the narrow slot portions 78 of the keyhole slots 72 and the bottom support in its locked configuration.

In some instances, it may be desirable to remove the bottom support 70 from the food product rack 22. The bottom support 70 can be removed from the food product rack 22 by manually rotating the bottom support in a horizontal plane about the vertical rotation axis of the food product rack 22 (e.g., in the counterclockwise direction) to place the locking projections 74 in the enlarged slot portions 76 of the keyhole slots 72, thereby placing the bottom support in its release orientation. In the release orientation, the bottom support can be lifted manually from the food product rack 22 and the pivot support member 96 disconnected from the fixed pivot support member 114.

Once the food product rack 22 is disconnected from the fixed pivot support member 114, the food product rack 22 can be removed from the cooking chamber 22 without any use of tools by manually lifting the food product rack until the top support 60 clears the pins 110 of the seating member 104 and by pulling the food product rack toward the door opening until the seating member clears the slot 108 of the top support. In some embodiments, the food product rack 22 has a weight of about 30 pounds.

Removing the bottom support 70 can also facilitate an oven cleaning operation. When connected to the food product rack 22, the bottom support 70 obstructs a portion of the floor 38 of the cooking chamber 12, which can render cleaning of the floor more difficult (see FIG. 2 showing the bottom support obstructing the floor 38). Removal of the bottom support 70 exposes more of the floor 38 to the operator for the oven cleaning operation.

The above-described food product rack 22 and removable bottom support 70 provides a number of advantages. The bottom support 70, when connected to the food support rack 22, provides a bearing point so that the load will not sway or oscillate when rotating. The bottom support 70 also ties opposite sides 26 and 28 of the food product rack 22 together. The keyhole slot arrangements allow the bottom support 70 to be removed manually without use of any tools and the key hole slots 72 are arranged and aligned so that the drive rotation of the food product tray 22 will place the bottom support in its locked configuration. Removal of the bottom support 70 exposes more of the floor of the cooking chamber without removing the entire rack 22 for cleaning.

It is to be clearly understood that the above description is intended by way of illustration and example only and is not intended to be taken by way of limitation, and that changes and modifications are possible. Accordingly, other embodiments are contemplated and modifications and changes could be made without departing from the scope of this application.

What is claimed is:

1. An oven, comprising:
 a chamber for receiving a food product rack;
 a heating system that provides heat to the chamber for a cooking operation;
 a rotatable output member extending downward from a top portion of the chamber;
 a pivot support extending upward from a bottom portion of the chamber;
 a food product rack removably located in the chamber and releasably connected to the rotatable output member for rotation therewith, the food product rack comprising:
  a frame assembly including multiple sides;
  multiple tray supports located along the height of the frame assembly; and
  a bottom support extending laterally between opposite sides of the frame assembly and passing through a vertical rotation axis of the frame assembly, the bottom support connected at one end to a bottom portion of one side of the frame assembly and connected at an opposite end to the bottom portion of an opposite side of the frame assembly, the bottom support releasably engaged with the frame assembly and configured to be disconnected from the frame assembly without use of tools by manually reorienting the bottom support from a locked orientation to a release orientation, the bottom support including an underside engaged with the pivot support.

2. The oven of claim 1, wherein one of the bottom portion of the food product rack and the bottom support includes a locking projection extending outwardly therefrom and the other of the bottom portion and the bottom support includes a keyway slot, the locking projection having an enlarged head portion atop a shaft portion of the locking projection, the keyway slot having an enlarged opening through which the enlarged head portion is received and a narrow opening that slidably receives the shaft portion of the first locking projection with the enlarged head portion overhanging edges of the narrow opening.

3. The oven of claim 1, wherein the food product rack further comprises a first locking projection extending upwardly from the bottom portion of the one side of the frame assembly, the first locking projection having an enlarged head portion atop a shaft portion of the first locking projection, the bottom support including a first keyway slot having an enlarged opening through which the enlarged head portion is received and a narrow opening that slidably receives the shaft portion of the first locking projection with the enlarged head portion overhanging edges of the narrow opening.

4. The oven of claim 3, wherein the food product rack further comprises a second locking projection extending upwardly from the bottom portion of the opposite side of the frame assembly, the second locking projection having an enlarged head portion atop a shaft portion of the second locking projection, the bottom support including a second keyway slot having an enlarged opening through which the enlarged head portion of the second locking projection is received and a narrow opening that slidably receives the shaft portion of the second locking projection with the enlarged head portion of the second locking projection overhanging edges of the narrow opening of the second keyway slot.

5. The oven of claim 4, wherein the first and second keyway slots are arranged and configured such that manual rotation of the bottom support in a horizontal plane in a first direction places the bottom support in the release orientation with the first locking projection in the enlarged opening of the first keyway slot and with the second locking projection in the enlarged opening of the second keyway slot so that lifting the bottom support vertically passes the enlarged heads of the first and second locking projections through the enlarged openings of the first and second keyway slots to remove the bottom support from the food product rack.

6. The oven of claim 5, wherein the food product rack further comprises:
 a third locking projection extending upwardly from the bottom portion of the one side of the frame assembly, the third locking projection having an enlarged head portion atop a shaft portion of the third locking projection, the bottom support including a third keyway slot having an enlarged opening through which the enlarged head portion of the third locking projection is received and a narrow opening that slidably receives the shaft portion of the third locking projection with the enlarged head portion of the third locking projection overhanging edges of the narrow opening of the third keyway slot;
 wherein the first keyway slot has a long axis that extends through a center of the enlarged opening of the first keyway slot and through a center of the narrow opening of the first keyway slot, wherein the third keyway slot has a long axis that extends through a center of the enlarged opening of the third keyway slot and through a center of the narrow opening of the third keyway slot, wherein the long axis of the first keyway slot extends at an angle to the long axis of the third keyway slot.

7. The oven of claim 6, wherein the food product rack further comprises:
 a fourth locking projection extending upwardly from the bottom portion of the opposite side of the frame assembly, the fourth locking projection having an enlarged head portion atop a shaft portion of the fourth locking projection, the bottom support including a fourth keyway slot having an enlarged opening through which the enlarged head portion of the fourth locking projection is received and a narrow opening that slidably receives the shaft portion of the fourth locking projection with the enlarged head portion of the fourth locking projection overhanging edges of the narrow opening of the fourth keyway slot;
 wherein the second keyway slot has a long axis that extends through a center of the enlarged opening of the second keyway slot and through a center of the narrow opening of the second keyway slot, wherein the fourth keyway slot has a long axis that extends through a center of the enlarged opening of the fourth keyway slot and through a center of the narrow opening of the fourth keyway slot, wherein the long axis of the second keyway slot extends at an angle to the long axis of the fourth keyway slot.

8. The oven of claim 1, wherein the support member includes an opening extending therethrough that is centrally located in the support member, a plate is connected to the support member that spans the opening in the support member, a shaft extends downwardly from the plate and through the opening in the support member, the shaft operatively connected to the pivot support that provides a pivot location for the food product rack when being rotated by the rotatable output member.

9. A method of cleaning a rack oven including a heating system that provides heat to a chamber for a cooking operation, the method comprising:
 performing a cooking operation using a food product rack including a frame assembly removably located within the chamber of the rack oven, the food product rack releasably connected to a rotatable output member in the chamber for rotating the food product rack about a vertical rotation axis during the cooking operation; and
 removing a bottom support from the food product rack overlying a floor of the heating chamber, the bottom support releasably connected at one end to a bottom portion of one side of the frame assembly and connected at an opposite end to the bottom portion of an opposite side of the frame assembly, the bottom support releasably engaged with the frame assembly and the removing step occurring by manually reorienting the bottom support from a locked configuration to a release configuration.

10. The method of claim 9, wherein the step of removing the bottom support from the food product rack comprises rotating the bottom support about the vertical rotation axis relative to the frame assembly.

11. The method of claim 10, wherein the step of removing the bottom support from the food product rack includes aligning a first locking projection extending upwardly from the bottom portion of the one side of the frame assembly with an enlarged slot portion of a first keyway slot so that lifting the bottom support vertically passes an enlarged head portion of the first locking projection through the enlarged slot portion of the first keyway slot.

12. The method of claim 11, wherein the step of removing the bottom support from the food product rack includes aligning a second locking projection extending upwardly from the bottom portion of the one side of the frame assembly with an enlarged slot portion of a second keyway slot so that lifting the bottom support vertically passes an enlarged head portion of the second locking projection through the enlarged slot portion of the second keyway slot.

13. The method of claim 12, wherein the wherein the first keyway slot has a long axis that extends through a center of the enlarged slot portion of the first keyway slot and through a center of a narrow slot portion of the first keyway slot, wherein the second keyway slot has a long axis that extends through a center of the enlarged slot portion of the second keyway slot and through a center of a narrow slot portion of the second keyway slot, wherein the long axis of the first keyway slot extends at an angle to the long axis of the second keyway slot.

14. A food product rack for an oven including a chamber for receiving the food product rack, a heating system that provides heat to the chamber for a cooking operation and a rotatable output member extending downward from a top portion of the chamber, the food product rack comprising:
 a frame assembly including multiple sides, the frame assembly connectable to the rotatable output member of the oven for rotation during a cooking operation;
 multiple tray supports located along the height of the frame assembly; and
 a bottom support extending laterally between opposite sides of the frame assembly and passing through a vertical rotation axis of the frame assembly, the bottom support connected at one end to a bottom portion of one side of the frame assembly and connected at an opposite end to the bottom portion of an opposite side of the frame assembly, the bottom support releasably engaged with the frame assembly and configured to be disconnected from the frame assembly without use of tools by manually reorienting the bottom support from a locked orientation to a release orientation;

a first locking projection extending upwardly from the bottom portion of the one side of the frame assembly, the first locking projection having an enlarged head portion atop a shaft portion of the first locking projection, the bottom support including a first keyway slot having an enlarged opening through which the enlarged head portion is received and a narrow opening that slidably receives the shaft portion of the first locking projection with the enlarged head portion overhanging edges of the narrow opening; and a second locking projection extending upwardly from the bottom portion of the opposite side of the frame assembly, the second locking projection having an enlarged head portion atop a shaft portion of the second locking projection, the bottom support including a second keyway slot having an enlarged opening through which the enlarged head portion of the second locking projection is received and a narrow opening that slidably receives the shaft portion of the second locking projection with the enlarged head portion of the second locking projection overhanging edges of the narrow opening of the second keyway slot;

wherein the first and second keyway slots are arranged and configured such that manual rotation of the bottom support in a horizontal plane in a first direction places the bottom support in the release orientation with the first locking projection in the enlarged opening of the first keyway slot and with the second locking projection in the enlarged opening of the second keyway slot so that lifting the bottom support vertically passes the enlarged heads of the first and second locking projections through the enlarged openings of the first and second keyway slots to remove the bottom support from the food product rack.

15. The food product rack of claim 14 further comprising:
a third locking projection extending upwardly from the bottom portion of the one side of the frame assembly, the third locking projection having an enlarged head portion atop a shaft portion of the third locking projection, the bottom support including a third keyway slot having an enlarged opening through which the enlarged head portion of the third locking projection is received and a narrow opening that slidably receives the shaft portion of the third locking projection with the enlarged head portion of the third locking projection overhanging edges of the narrow opening of the third keyway slot;

wherein the first keyway slot has a long axis that extends through a center of the enlarged opening of the first keyway slot and through a center of the narrow opening of the first keyway slot, wherein the third keyway slot has a long axis that extends through a center of the enlarged opening of the third keyway slot and through a center of the narrow opening of the third keyway slot, wherein the long axis of the first keyway slot extends at an angle to the long axis of the third keyway slot.

16. The food product rack of claim 15 further comprising:
a fourth locking projection extending upwardly from the bottom portion of the opposite side of the frame assembly, the fourth locking projection having an enlarged head portion atop a shaft portion of the fourth locking projection, the bottom support including a fourth keyway slot having an enlarged opening through which the enlarged head portion of the fourth locking projection is received and a narrow opening that slidably receives the shaft portion of the fourth locking projection with the enlarged head portion of the fourth locking projection overhanging edges of the narrow opening of the fourth keyway slot;

wherein the second keyway slot has a long axis that extends through a center of the enlarged opening of the second keyway slot and through a center of the narrow opening of the second keyway slot, wherein the fourth keyway slot has a long axis that extends through a center of the enlarged opening of the fourth keyway slot and through a center of the narrow opening of the fourth keyway slot, wherein the long axis of the second keyway slot extends at an angle to the long axis of the fourth keyway slot.

* * * * *